(12) United States Patent
Kuhn et al.

(10) Patent No.: US 11,142,810 B2
(45) Date of Patent: Oct. 12, 2021

(54) SLIDING ELEMENT CONSISTING OF A COPPER-ZINC ALLOY

(71) Applicant: WIELAND-WERKE AG, Ulm (DE)

(72) Inventors: Hans-Achim Kuhn, Illertissen (DE); Susanne Böhme, Ulm (DE); Tobias Neubrand, Munderkingen (DE); Gerhard Thumm, Erbach (DE); Volker Voggeser, Senden (DE)

(73) Assignee: WIELAND-WERKE AG, Ulm (DE)

( * ) Notice: Subject to any disclaimer, the term of this patent is extended or adjusted under 35 U.S.C. 154(b) by 612 days.

(21) Appl. No.: 16/077,203

(22) PCT Filed: Feb. 3, 2017

(86) PCT No.: PCT/EP2017/000144
§ 371 (c)(1),
(2) Date: Aug. 10, 2018

(87) PCT Pub. No.: WO2017/140411
PCT Pub. Date: Aug. 24, 2017

(65) Prior Publication Data
US 2020/0283872 A1    Sep. 10, 2020

(30) Foreign Application Priority Data
Feb. 19, 2016 (DE) .................. 10 2016 001 994.8

(51) Int. Cl.
*C22C 9/04* (2006.01)
*F16C 33/12* (2006.01)

(52) U.S. Cl.
CPC .............. *C22C 9/04* (2013.01); *F16C 33/121* (2013.01); *F16C 2204/14* (2013.01)

(58) Field of Classification Search
CPC .................................................. F16L 2204/14
See application file for complete search history.

(56) References Cited

U.S. PATENT DOCUMENTS

2007/0227631 A1  10/2007 Gaag et al.
2013/0115128 A1  5/2013 Lawrence

FOREIGN PATENT DOCUMENTS

| DE | 759 865 C | 4/1951 |
|---|---|---|
| DE | 1 558 470 A1 | 3/1970 |
| DE | 2 159 482 A1 | 6/1973 |
| DE | 10 2007 029 991 B4 | 8/2013 |
| EP | 1 158 062 B1 | 11/2001 |
| JP | 748665 A | 2/1995 |
| JP | 2009-41088 A | 2/2009 |
| KR | 10-2006-0096877 A | 9/2006 |

OTHER PUBLICATIONS

International Search Report issued in Application No. PCT/EP2017/000144 with English translation, dated Jun. 7, 2017 (5 pages).
Written Opinion of International Searching Authority issued in Application No. PCT/EP2017/000144, dated Jun. 7, 2017 (5 pages).
Office Action of German Patent Office issued in Application No. 10 2016 001 994.8, dated Feb. 9, 2017 (6 pages).
Dies, Kurt: Kupfer und Kupferlegierungen in der Technik. Berlin, Heidelberg, New York: Springer-Verlag, 1967. S. 484-487 Article (6 pages).
First Examination Report issued in corresponding Indian Application No. 201817028390 dated May 5, 2021 (5 pages).

*Primary Examiner* — Anthony J Zimmer
*Assistant Examiner* — Anthony M Liang
(74) *Attorney, Agent, or Firm* — Flynn Thiel, P.C.

(57) ABSTRACT

The invention relates to a sliding element consisting of a copper-zinc alloy containing the following components (in % by weight): 60.0 to 64.0% Cu, 0.2 to 0.5% Si, 0.6 to 1.2% Fe, optionally also up to a maximum 1.5% Sn, optionally also up to a maximum 0.25% Pb, optionally also up to a maximum 0.08% P, the remainder being Zn and unavoidable impurities. The copper-zinc alloy has a grain structure consisting of an α- and β-phase with a volume content of the α-Phase of at least 90%, and iron silicides are embedded in the grain structure.

7 Claims, No Drawings

SLIDING ELEMENT CONSISTING OF A COPPER-ZINC ALLOY

The invention relates to a sliding element composed of a copper-zinc alloy.

Sliding elements composed of copper-zinc alloys are, for example, used in internal combustion engines in both bearing positions of a connecting rod. The technical demands made of the material of the sliding elements are becoming ever greater with the development of modern engines. Legal requirements additionally demand that the proportion of lead in the material be reduced to a minimum. At the same time, the pressure of decreasing the costs of the sliding elements is increasing.

A known copper-zinc alloy for sliding elements is CuZn31Si1. Up to 0.8% by weight of lead can be added to the alloy in order to improve the cutting machinability of the material. The high proportion of copper in this alloy makes the sliding element expensive. Furthermore, the contact area ratio of the wear-resistant microstructural constituents is too low in the case of this alloy to withstand the stresses prevailing in modern engines in the future.

A lead-free copper-zinc-aluminum forging material which has very advantageous mechanical properties for sliding elements is known from the document EP 1 158 062 B1. However, its low thermal conductivity prevents an economical speed in continuous casting.

Furthermore, a copper-zinc alloy for highly stressed sliding elements is known from the document DE 10 2007 029 991 B4. The material has a wear-resistant microstructure having a matrix composed of α phase in which island-like β phase and hard mixed silicides are embedded. The material displays an excellent combination of properties, but its complex microstructure requires complicated and careful process conditions.

A particular form of sliding elements is sliding bearing bushings. Among sliding bearing bushings, a distinction is made between rolled and turned bushings on the basis of the different production routes.

Rolled bushings are produced from a strip-like semifinished part, by forming an appropriately dimensioned section of strip to give a hollow cylinder and joining the abutting strip edges. The starting material is preferably produced by a strip casting process. Here, a relatively thin strip is cast as cast format. This is rolled without hot forming to the final dimensions by means of a few cold forming steps, with intermediate heat treatments being able to be carried out if necessary. The alloy used thus has to be readily castable and be able to be cold formed very readily. Furthermore, it has to harden quickly as a result of cold forming, so that a sufficient strength and hardness is achieved using little cold forming.

Turned bushings are produced by cutting machining from a rod- or tube-like semifinished part. To produce the semifinished part, a pin-like cast format is cast, and a pressed tube or a rod is pressed therefrom by a hot pressing operation. The semifinished part is obtained from the respective pressed product by means of a sequence of drawing operations, and the sliding bearing bushing is produced from this semifinished part. For this production route, the alloy used has to be readily hot-formable and cold-formable. Furthermore, the alloy has to be able to be subjected to cutting machining easily.

It is an object of the invention to provide a sliding element which is resistant to wear by rubbing against steel and is cheaper than the sliding elements known from the prior art. The reduction in costs should be generated predominantly by inexpensive production of the semifinished part from which the sliding bearing is made. The cost advantages should be able to be realized both in the production of rolled sliding bearing bushings and also of turned sliding bearing bushings. The sliding element has to satisfy technical and legal requirements.

A preferred embodiment of the invention comprises a sliding element composed of a copper-zinc alloy, wherein the copper-zinc alloy has the following composition (in % by weight):

from 60.0 to 64.0% of Cu,
from 0.2 to 0.5% of Si,
from 0.6 to 1.2% of Fe,
optionally up to a maximum of 1.5% of Sn,
optionally up to a maximum of 0.25% of Pb,
optionally up to a maximum of 0.08% of P,
balance Zn and unavoidable impurities.

The copper-zinc alloy has a microstructure which consists of α phase and β phase and has a proportion by volume of the α phase of at least 90%, with iron silicides being embedded in the microstructure.

Bearing materials composed of copper-zinc alloys usually have a proportion of α phase of less than 90% by volume because the α phase has a tendency to adhere and thus suffer greater wear than the β phase. On the other hand, a high proportion of α phase makes the material ductile. The invention is based on the recognition that addition of iron and silicon to a copper-zinc alloy having a copper content of from 60 to 64% by weight results in formation of a forging material which is very ductile and at the same time very wear-resistant. The proportion of silicon in the alloy is at least 0.2% by weight and not more than 0.5% by weight, and the proportion of iron is at least 0.6% by weight and not more than 1.2% by weight. The alloy optionally contains up to 1.5% by weight of tin, up to 0.25% by weight of lead and up to 0.08% by weight of phosphorus. The proportion of zinc in the alloy can, depending on the precise composition of the alloy, be in the range from 32.5 to 38.5% by weight, preferably from 33.5 to 38% by weight, particularly preferably from 34 to 37.5% by weight. A material which is produced from a copper-zinc forging alloy having this composition has a microstructure which consists of α phase and β phase and has a proportion by volume of the α phase of at least 90%. Iron silicides are embedded in this microstructure in a proportion by volume which can be from 1.5 to 4.5%. The proportion of the β phase is consequently below 9% by volume, usually below 5% by volume and preferably below 3% by volume. Typically, at least 0.3% by volume of β phase is present in the microstructure.

Iron silicides are, as hard phases, the cause of the good wear resistance of the material. At a silicon content below 0.2% by weight, too little iron silicides would be formed. A proportion of silicon of more than 0.5% by weight would lead to increased formation of the β phase and thus reduce the ductility. The proportion of silicon can particularly preferably be a maximum of 0.47% by weight. At an iron content below 0.6% by weight, too little iron silicides would be formed. The proportion of iron is particularly preferably at least 0.8% by weight. A proportion of iron of more than 1.2% by weight would not dissolve in the alloy on melting. Pure iron particles would then be formed in the material, but these are undesirable because they are soft and also could easily break out from the material. The iron silicides form hard phases having a globular shape without sharp edges. The formation of internal notches or hollow spaces in the microstructure, which can occur in the case of sharp-edged hard phases after forming, is thus suppressed.

The proportions by volume of the individual constituents of the microstructure of the copper-zinc alloy are determined with the aid of metallographic polished sections. Studies show that the proportions by area of the individual constituents of the microstructure determined on polished sections are independent of the orientation of the polished section area in the specimen. The distribution of the individual phases can thus be considered to be isotropic and the proportions by area determined on the polished section can be taken as proportions by volume of the respective constituents of the microstructure.

Up to 1.5% by weight of tin can optionally be added to the alloy. Tin increases the wear resistance of the material by means of mixed crystal hardening. On the other hand, tin reduces the ductility of the material since it has a zinc equivalent of 2 and thus favors the formation of the β phase at the expense of the α phase. An upper limit of 1.5% by weight has been found to be advantageous for the proportion of tin.

In principle, the lead content of the alloy can be up to 0.8% by weight. If legal requirements allow, up to 0.25% by weight of lead as chip breaker can be added to the alloy if necessary. The proportion of lead is preferably not more than 0.1% by weight. However, the alloy particularly preferably has a proportion of lead which is in the range of the unavoidable impurities. The function of a sliding element according to the invention is not impaired by the absence of lead in the copper-zinc alloy.

Up to 0.08% by weight of phosphorus can optionally be added to the alloy. Phosphorus serves to deoxidize the melt and thus avoid tin oxides in the presence of tin.

A sliding element according to the invention is produced by a semifinished part made of the abovementioned copper-zinc forging alloy. The semifinished part is produced by means of a process which comprises the steps melting of the alloy, casting and forming in the order specified. Here, the forming steps can be exclusively cold forming steps or a hot forming step can be carried out between casting of the cast format and the first cold forming step. If necessary, a heat treatment can be carried out between two forming steps.

The abovementioned copper-zinc forging alloy has properties which make inexpensive production of suitable semifinished parts for sliding elements possible. The thermal conductivity of the alloy is so high that the casting speed is at the level of the casting speed of conventional special brasses. The proportion of the β phase in the cast microstructure is sufficiently high for economical production of semifinished parts by hot forming to be possible. The particular advantage lies in the good cold formability of the material. Degrees of deformation of up to 80% can be achieved without intermediate heat treatment. Here, the degree of deformation is defined as the reduction of the cross-sectional area during forming. The final dimensions of the semifinished part can therefore be achieved in few process steps and in particular using few intermediate heat treatment steps. Furthermore, the strength of the material increases very quickly during cold forming, so that few cold forming steps are required in order to achieve the strength of the material required to achieve the semifinished part dimensions typical for bearing materials.

The material can be subjected to a heat treatment at a temperature of from 200 to 350° C. for from 2 to 4 hours after the last cold forming step. This increases the ductility, but at the same time also reduces the strength. The yield point $R_{p0.2}$ of the material is reduced more greatly than the tensile strength $R_m$. Consequently, the ratio of $R_m$ to $R_{p0.2}$ changes as a result of a heat treatment. The ratio of $R_m$ to $R_{p0.2}$ can thus be used as a measure of the intensity of the heat treatment. In the case of the material of the sliding element of the invention, the ratio of $R_m$ to $R_{p0.2}$ before the final heat treatment is usually in the range from 1.05 to 1.1. After the heat treatment, the ratio $R_m/R_{p0.2}$ can attain values up to more than 1.5. The ductility and thus the elongation at break $A_5$ increases as a result of the heat treatment. The more intensive the heat treatment, the greater the increase in the elongation at break. The elongation at break attained after a heat treatment correlates with the ratio $R_m/R_{p0.2}$. In the case of a material of the sliding element of the invention, the following correlation between elongation at break $A_5$ (in %) and the ratio $R_m/R_{p0.2}$ generally applies:

$$A_5 \geq 41\% \cdot (R_m/R_{p0.2}) - 38\%$$

In the final state, the material has sufficient ductility for rolled sliding bearing bushings to be able to be produced. Furthermore, the finished sliding bearing bushings can be calibrated without problems.

The wear resistance of a sliding element according to the invention is determined by means of suitable experiments and the ratio of this to the wear resistance of sliding elements made of known materials is calculated. In tribometer tests in which the wear is determined as decrease in mass of a test specimen on rubbing against a steel body, it is found that the decrease in mass is about half as great in the case of sliding elements according to the invention than in the case of sliding elements composed of the material CuZn31Si. The coefficient of friction is approximately equal for all materials. This surprising result documents the excellent properties of said copper-zinc alloy when used as material for a sliding element.

Since the base material consists predominantly of face-centered cubic α phase, embedding of hard dirt particles is ensured by the high ductility.

The ratio of the proportion of Fe to the proportion of Si can advantageously be at least 1.5 and not more than 3.8. In this case, particularly advantageous conditions for the formation of the iron silicides FeSi, $Fe_5Si_3$ and $Fe_2Si$ prevail. The excess of iron or silicon which is not bound in iron silicides is then very low. The excess of silicon which is not bound in iron silicides is present in the matrix of the alloy. It has a zinc equivalent of 10 and therefore acts like an increase in the proportion of zinc in the alloy. The consequences of a large excess of silicon would be increased mixed crystal hardening, which would reduce the ductility of the material, and an undesirable increase in the proportion of β phase in the microstructure. The ratio of the proportion of Fe to the proportion of Si can particularly preferably be at least 2.2 and not more than 3.0. If the proportion of Fe and the proportion of Si are matched to one another in this way, the population type number of the iron silicides is increased. A number of fractions of iron silicides which differ in terms of their particle size can then be formed.

In a preferred embodiment of the invention, at least two fractions of iron silicides can be present in the copper-zinc alloy of the sliding element. In this case, first iron silicides can have a diameter of at least 0.02 μm and not more than 0.3 μm and a density of from 200 to 400 particles per 1000 μm² and second iron silicides can have a diameter of at least 1 μm and not more than 15 μm and a density of from 20 to 50 particles per 100 000 μm². Here, the diameter of an iron silicide particle is defined as the diameter of a sphere having a volume equal to that of the particle. In this embodiment, the alloy of the sliding element of the invention thus has a first population of relatively small iron silicides and a second population of relatively large iron silicides. The second iron silicides act as particularly wear-resistant contact area. Their proportion by volume in the microstructure can be in the range from 1 to 2%. Owing to the low density of the second iron silicides, relatively large interstices remain between these. These interstices are stabilized by the first iron silicides. Without the first iron silicides, the matrix of the material would quickly be removed by wear in the interstices between the second iron silicides. Depressions would be formed. As a result, the second iron silicides would project in an island-like manner from the matrix and then would easily break out of the material. As a result of the first iron silicides stabilizing the matrix in the interstices, they prevent the second iron silicides from breaking out. The combination of first and second iron silicides is thus essential for the particular wear resistance of the material.

In a preferred embodiment of the invention, the proportion of Sn in the copper-zinc alloy can be at least 0.5% by weight. Tin has an advantageous effect on strength and hardness and thus on the wear resistance of the alloy. This effect is small at proportions of tin below 0.5% by weight. The proportion of tin in the alloy is particularly preferably at least 0.8% by weight. On the other hand, a large proportion of tin stands in the way of an increase in the ductility of the material in the case of a heat treatment. It is therefore particularly advantageous for the proportion of tin in the alloy to be not more than 1.2% by weight. Furthermore, in this embodiment of the invention, a final state in which the yield point of the material is significantly reduced even though the tensile strength and the hardness remain at a high level can be obtained by means of a heat treatment. This particular property is advantageous for the production of turned bushings which have to be calibrated after the shaping machining and also for the ability of the sliding element to cope with hard dirt particles.

When the hardness HB achieved after heat treatment is correlated with the ratio of tensile strength $R_m$ to yield point $R_{p0.2}$ for materials according to this preferred embodiment of the invention, the following relationship is obtained:

$$HB \geq 350 - 140 \cdot (R_m/R_{p0.2})$$

In a particularly preferred embodiment of the invention, in which a copper-zinc alloy has a proportion of tin of at least 0.5% by weight, the proportion by volume of the β phase can be not more than 5% and a tin-rich phase can be present at phase boundaries between α phase and β phase. The proportion by volume of the β phase can be set via the actual Zn content of the alloy and by suitable process conditions in the heat treatments. If the proportion of the β phase is not more than 5% by volume, then the material is very readily cold-formable. The tin-rich phase is configured like a seam having a width of from 1 to 3 μm at the phase boundaries. The tin-rich phase contains from 7 to 13% by weight of tin, from 34 to 38% by weight of zinc and copper as balance. It does not contain any Fe nor any Si. The tin-rich phase acts, in addition to the iron silicides, as a wear-resistant contact area in the microstructure consisting predominantly of α phase. This particularly preferred embodiment of the sliding bearing of the invention thus has a very readily cold-formable material which is at the same time very wear resistant.

In an alternative advantageous embodiment of the sliding element of the invention, the Sn content of the copper-zinc alloy can be not more than 0.09% by weight. Such a low-tin alloy displays a particularly high ductility. The alloy can thus be brought to the final dimensions by means of a small number of cold forming steps and intermediate heat treatments. This keeps the production costs of a sliding bearing according to the invention low. For the final state of the material, it is advantageous for a high ductility to be attained even at a low intensity of the heat treatment, i.e. at a low heat treatment temperature and/or short heat treatment time. As a result, the yield point of the material after heat treatment remains at a relatively high level. For a material according to this advantageous embodiment of the sliding element of the invention, the elongation at break $A_5$ (in %) and the ratio $R_m/R_{p0.2}$ have the following correlation:

$$A_5 \geq 46\% \cdot (R_m/R_{p0.2}) - 38\%$$

The high ductility of the material in the final state is advantageous for the production of rolled sliding bearings. On the other hand, such a sliding bearing has a high resistance to plastic deformation during operation as a result of the high yield point of the material.

In this alternative advantageous embodiment of the invention, the proportion by volume of the β phase in low-tin copper-zinc alloys can preferably be not more than 4% and particularly preferably not more than 3%. The proportion by volume of the β phase can be set via the actual Zn content of the alloy and by means of suitable process conditions in the heat treatments. The limitation of the proportion by volume of the β phase has a positive effect on the ductility of the material. This particularly preferred embodiment of the sliding bearing of the invention thus has a material which displays a particularly high ductility at a high strength.

The invention will be illustrated with the aid of working examples.

Various samples of copper-zinc alloys were melted and cast. Table 1 shows the composition of the individual samples. In the penultimate column, the ratio of iron to silicon is reported. The last column shows how suitable the respective alloy is for the purpose defined in the objective. Here, both the suitability of the alloy in respect of the ability to produce the semifinished part and also its suitability in respect of use as sliding element have gone into the evaluation.

TABLE 1

Composition of the samples in % by weight

| Sample No. | Cu wt-% | Fe wt-% | Si wt-% | Sn wt-% | Pb wt-% | P wt-% | Zn and impurities wt-% | Fe/Si | Suitability |
|---|---|---|---|---|---|---|---|---|---|
| 1 | 61.60 | 0.850 | 0.211 | 1.000 | <0.05 | 0.006 | balance | 4.03 | good |
| 2 | 61.08 | 0.788 | 0.329 | 1.020 | <0.05 | 0.007 | balance | 2.40 | excellent |
| 3 | 61.88 | 0.921 | 0.219 | 1.004 | <0.05 | 0.008 | balance | 4.21 | good |
| 4 | 63.56 | 0.892 | 0.235 | 1.007 | <0.05 | 0.006 | balance | 3.80 | very good |
| 5 | 60.86 | 0.884 | 0.241 | 0.987 | <0.05 | 0.004 | balance | 3.67 | very good |
| 6 | 60.43 | 0.853 | 0.300 | 1.018 | <0.05 | 0.007 | balance | 2.84 | excellent |
| 11 | 62.50 | 0.803 | 0.322 | <0.01 | <0.05 | 0.0006 | balance | 2.49 | excellent |

TABLE 1-continued

Composition of the samples in % by weight

| Sample No. | Cu wt-% | Fe wt-% | Si wt-% | Sn wt-% | Pb wt-% | P wt-% | Zn and impurities wt-% | Fe/Si | Suitability |
|---|---|---|---|---|---|---|---|---|---|
| 12 | 62.40 | 0.771 | 0.261 | 0.0026 | <0.05 | 0.0005 | balance | 2.95 | excellent |
| 13 | 62.06 | 0.926 | 0.249 | 0.01 | <0.05 | 0.0007 | balance | 3.72 | very good |
| 14 | 63.89 | 1.013 | 0.308 | 0.013 | <0.05 | 0.0006 | balance | 3.29 | very good |
| 15 | 61.71 | 0.835 | 0.220 | <0.01 | <0.05 | 0.0007 | balance | 3.80 | very good |
| 16 | 61.66 | 0.988 | 0.282 | <0.01 | <0.05 | 0.0005 | balance | 3.50 | very good |

The samples No. 1 to 6 have a proportion of tin of about 1% by weight, while samples No. 11 to 16 contain a maximum of 0.013% by weight of tin. Semifinished parts which are suitable for manufacturing sliding elements were produced from each alloy after casting via two different process routes.

The first process route comprises, after casting, the following steps:

1. extrusion
2. cold forming
3. intermediate heat treatment at 500° C./3 h
4. cold forming
5. heat treatment at 300° C.

This process route corresponds to the production of a semifinished part for turned sliding bearing bushings.

The second process route comprises, after casting, the following steps:

1. cold forming (rolling)
2. intermediate heat treatment at 500° C./3 h
3. cold forming (rolling)
4. heat treatment at 300° C.

This process route corresponds to the production of a semifinished part for rolled sliding bearing bushings.

The samples No. 6 (tin-containing) and 11 (low-tin) were examined in more detail. Here, the temperature and the time of the final heat treatment were varied. In the case of sample No. 6, the mechanical properties shown in Table 2 were achieved. In the case of sample No. 11, the mechanical properties shown in Table 3 were achieved.

TABLE 2

Mechanical properties of sample No. 6 after heat treatment

| | Tensile strength $R_m$ in MPa | Yield point $R_{p0.2}$ in MPa | $R_m/R_{p0.2}$ | Elongation at break $A_5$ in % | Hardness HB |
|---|---|---|---|---|---|
| Sample No. 6 | 635 | 542 | 1.172 | 11.7 | 190 |
| | 598 | 487 | 1.228 | 12.9 | 178 |
| | 587 | 486 | 1.209 | 16.9 | 182 |
| | 557 | 427 | 1.304 | 15.6 | 171 |
| | 524 | 395 | 1.327 | 22 | 157 |
| | 493 | 311 | 1.585 | 30 | 131 |

TABLE 3

Mechanical properties of sample No. 11 after heat treatment

| | Tensile strength $R_m$ in MPa | Yield point $R_{p0.2}$ in MPa | $R_m/R_{p0.2}$ | Elongation at break $A_5$ in % | Hardness HB |
|---|---|---|---|---|---|
| Sample No. 11 | 604 | 550 | 1.098 | 12.9 | 185 |
| | 595 | 527 | 1.129 | 16.1 | 181 |
| | 547 | 478 | 1.144 | 14.7 | 173 |
| | 536 | 452 | 1.186 | 17.5 | 167 |
| | 455 | 286 | 1.591 | 35.9 | 121 |

For both samples, the elongation at break $A_5$ could be increased to at least 15% by suitable selection of the temperature and the duration of the heat treatment. The hardness was then in the range from 170 to 180 HB, and the tensile strength was in the range from 550 to 600 MPa. The yield point for sample No. 11 was at a somewhat higher level than in the case of sample No. 6.

If the heat treatment was carried out in such a way that the elongation at break $A_5$ was increased to at least 20%, then the tensile strength of the material was at least 520 MPa and the hardness was at least 150 HB.

The tribological and wear properties of a sliding element according to the invention were examined by means of a disk-ring tribometer. A sliding element according to the invention was represented by a disk composed of the materials as per sample 6 and sample 11. A ring composed of steel served as counterelement. A sliding element composed of the material CuZn31Si1 was used as comparative object. Test specimens composed of a material which had an elongation at break $A_5$ of about 15% after the final heat treatment were in each case used for the studies. The coefficient of friction was defined and determined in a known manner. The decrease in mass of the test specimen after a particular duration of the experiment served as measure of the wear of the material. The decrease in mass was divided by the decrease in mass of the comparative object and is referred to as relative decrease in mass. Table 4 shows the results of these studies.

TABLE 4

Results of the studies on the wear properties

| | CuZn31Si1 | Sample 6 | Sample 11 |
|---|---|---|---|
| Coefficient of friction μ [—] | 0.093 | 0.103 | 0.084 |
| Relative decrease in mass | 100% | 47.8% | 46.7% |

The coefficient of friction of sample 6 was 11% above that of the sample composed of CuZn31Si1, and the coefficient of friction of sample 11 was 10% below that of the sample composed of CuZn31Si1. The decrease in mass of the sliding elements according to the invention was less than half the decrease in mass determined on the comparative object composed of CuZn31Si1. The materials of the sliding element of the invention are thus significantly more wear-resistant than CuZn31Si1.

The invention claimed is:

1. A sliding element composed of a copper-zinc alloy comprising:
   from 60.0 to 64.0% by weight of Cu,
   from 0.2 to 0.5% by weight of Si,
   from 0.6 to 1.2% by weight of Fe,
   optionally up to a maximum of 1.5% by weight of Sn,
   optionally up to a maximum of 0.25% by weight of Pb,
   optionally up to a maximum of 0.08% by weight of P,
   the balance being Zn and unavoidable impurities,
   the copper-zinc alloy having a microstructure comprising a matrix and iron silicides being embedded in the matrix, wherein the matrix comprises α and β phase, and wherein the microstructure has at least 90% by volume of the α phase.

2. The sliding element as claimed in claim 1, wherein the Fe and Si are in the alloy in a weight ratio of Fi to Si of at least 1.5 and not more than 3.8.

3. The sliding element as claimed in claim 1, wherein the iron silicides are comprised of at least first iron silicides and second iron silicides wherein the first iron silicides have a diameter of not more than 0.3 μm and a density of from 200 to 400 particles per 1,000 μm$^2$, and wherein the second iron silicides have a diameter of at least 1 μm and not more than 15 μm and a density of from 20 to 50 particles per 100,000 μm$^2$.

4. The sliding element as claimed in claim 1, wherein the alloy comprises Sn in an amount of at least 0.5% by weight and up to 1.5% by weight.

5. The sliding element as claimed in claim 4, wherein the volume of the β phase is not more than 5%, and a tin-rich phase is present at phase boundaries between α phase and β phase.

6. The sliding element as claimed in claim 1, wherein the Sn is not more than 0.09% by weight.

7. The sliding element as claimed in claim 6, wherein the volume of the β phase is greater than 0% and not more than 4%.

* * * * *